March 29, 1966  R. KREMP ETAL  3,242,840
CAMERAS WITH COLLAPSIBLE HANDLES
Filed Oct. 14, 1963  3 Sheets-Sheet 1
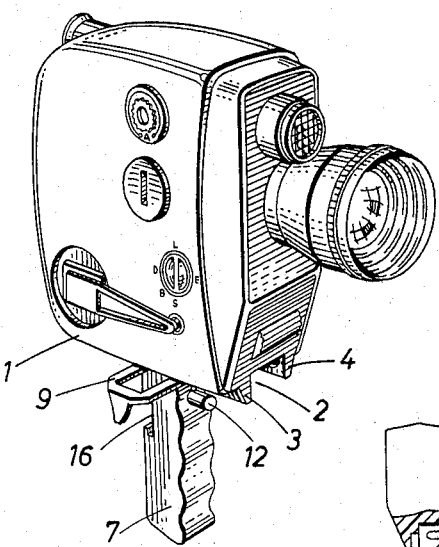
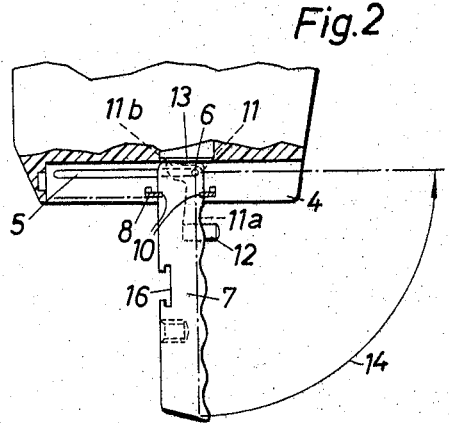
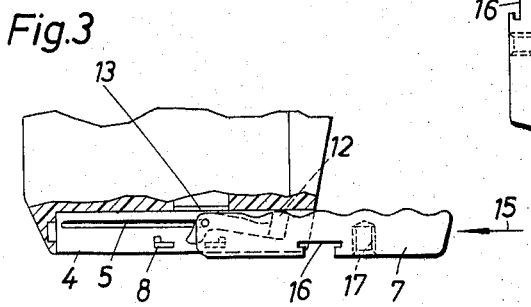
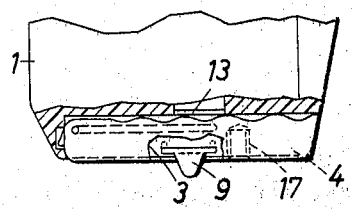
INVENTOR.
RUDOLF KREMP
FRIDOLIN HENNIG
BY
Michael J. Striker

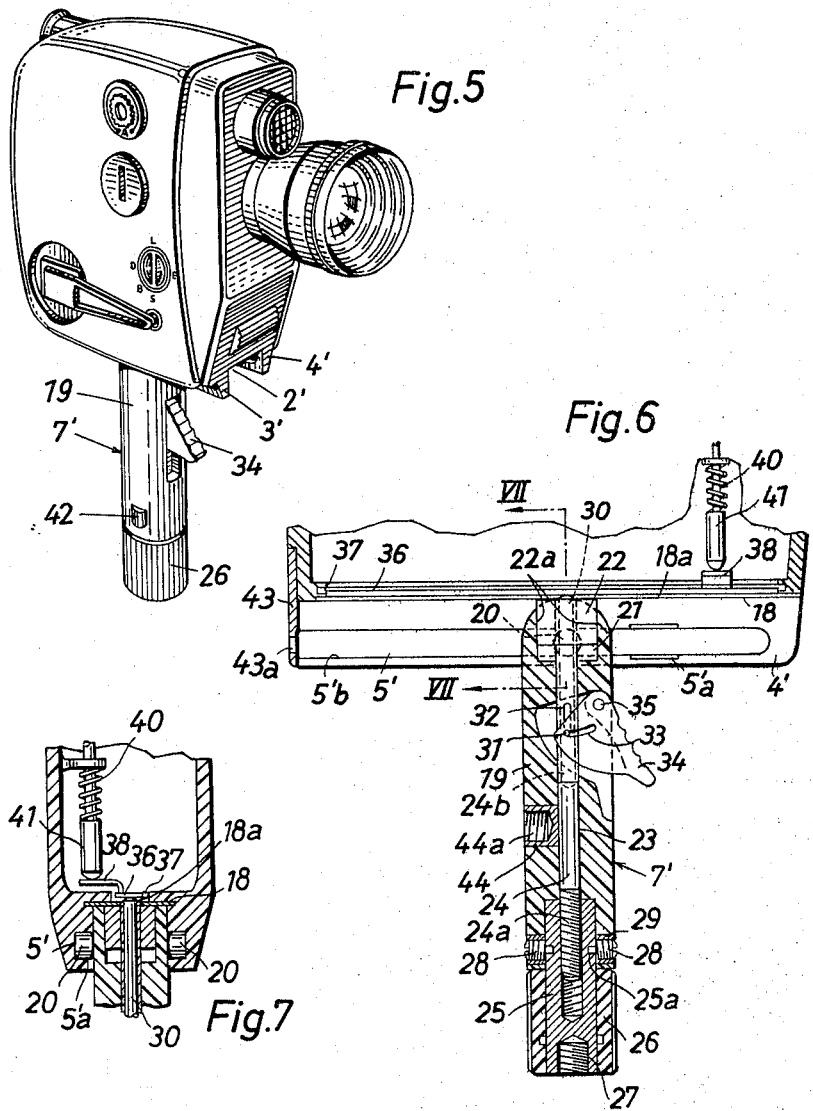

March 29, 1966   R. KREMP ETAL   3,242,840
CAMERAS WITH COLLAPSIBLE HANDLES
Filed Oct. 14, 1963   3 Sheets-Sheet 3

INVENTOR.
RUDOLF KREMP
FRIDOLIN HENNIG
BY
Michael S. Striker

United States Patent Office 3,242,840
Patented Mar. 29, 1966

3,242,840
CAMERAS WITH COLLAPSIBLE HANDLES
Rudolf Kremp, Grunwald, and Fridolin Hennig, Munchen, Germany, assignors to Agfa Aktiengesellschaft, Leverkusen, Germany
Filed Oct. 14, 1963, Ser. No. 315,800
Claims priority, application Germany, Oct. 26, 1962,
A 41,475
8 Claims. (Cl. 95—86)

The present invention relates to cameras and in particular to cameras such as motion picture cameras which are provided with handles enabling the operator to support the camera during use thereof. In particular, the invention deals with elongated handles which often are in the form of pistol grips.

Of course, a handle of the above type should be located beneath the center of gravity of the camera to provide the best possible support thereof when the handle is held in the hand of the operator. However, up to the present time it has been possible to achieve this result in an economically feasible manner only with handles which are permanently fixed to the camera housing. Naturally such fixed handles are extremely undesirable because they greatly increase the area which must be occupied by the camera when it is not in use so that the camera is not at all convenient to carry about and store if it has such a fixed handle. In order to provide collapsible handles which do not project undesirably from the camera housing in their collapsed positions it has up to the present time been possible to use only relatively simple handles which are necessarily connected to the camera housing at locations which position the handles to one side of the center of gravity in an undesirable manner when the handles are turned out to their operative positions. There are certain multi-part handles which include a plurality of components turnably connected to the camera housing and capable of being turned simultaneously to an operative position where they cooperate to form a handle which is indeed located beneath the center of gravity, but such constructions are very complex and expensive not only because of the large number of components required to form the handle but also because these components must be very precisely manufactured to fit together in the desired manner both when the handle is in its operative position and when it is collapsed with its various components separated from each other.

It is accordingly a primary object of the present invention to provide a structure which avoids the above drawbacks.

Thus, it is an object of the present invention to provide for a camera a relatively simple handle of the elongated, pistol-grip type adapted to extend across and even beyond the palm of the gripping hand, which at the same time can on the one hand be located in an operative position beneath the center of gravity of the camera and on the other hand in a collapsed position extending along side of a wall of the camera and projecting to a minimum extent therefrom.

It is furthermore an object of the present invention to provide a structure of the above type in which the operator can very easily and quickly move the handle between its collapsed and operative positions.

Also, it is an object of the present invention to provide a structure to permit the operator to select a particular location of the handle relative to the camera when the handle is in its operative position so that the position of the handle can be adapted to the particular requirements of a particular operator to provide handling of the camera which is as comfortable as possible for a particular operator.

It is furthermore an object of the present invention to provide a structure of the above type which renders it possible to mount the camera on a support such as a tripod or the like when the handle is in its collapsed position.

Also, it is an object of the present invention to provide a camera of the above type which can be mounted on a support such as a tripod or the like when the handle is in its operative position.

With the above objects in view the invention includes, in a camera, a camera housing having a wall portion and an elongated handle located adjacent this wall portion. In accordance with the present invention a connecting means connects an end portion of the handle to this wall portion not only for turning movement relative thereto but also for shifting movement relative thereto, and this combination of shifting and turning movement of the handle relative to the wall portion of the camera housing enables the handle to be located very compactly along side of the camera housing in the collapsed position of the handle and at the same time beneath the center of gravity of the camera in the operative position of the handle where it projects from the wall portion of the camera housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a perspective illustration of one embodiment of a camera and camera handle structure according to the present invention;

FIG. 2 is a fragmentary partly sectional illustration showing details of the structure at the bottom of the camera housing and the handle cooperating therewith;

FIG. 3 shows the handle of FIG. 2 after it has been turned from the operative position of FIG. 2 to the position of FIG. 3 where the handle has been moved part of the way toward its collapsed position;

FIG. 4 shows the handle of FIGS. 1–3 locked in its final collapsed position;

FIG. 5 is a perspective illustration of another embodiment of the structure according to the present invention;

FIG. 6 is a longitudinal sectional view of the lower part of the camera and of the handle cooperating therewith, FIG. 6 being on an enlarged scale as compared to FIG. 5 and illustrating the details of this embodiment of the invention;

FIG. 7 is a fragmentary transverse sectional view taken along the line VII—VII of FIG. 6 in the direction of the arrows;

Figure 8:
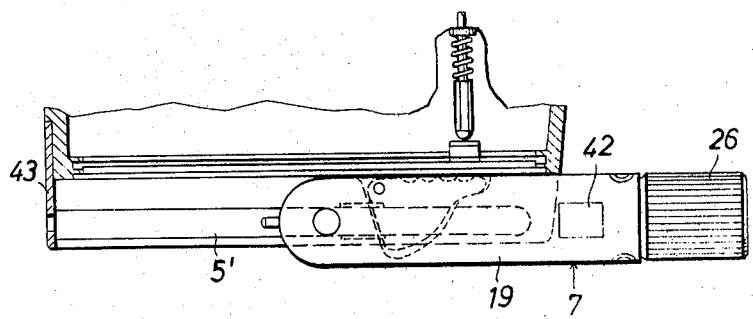
FIG. 8 shows the handle of FIGS. 5–7 after it has been turned to a position between its operative and collapsed positions.

Referring to FIGS. 1–4, the camera housing 1 has a bottom wall which is formed with the elongated groove 2 extending longitudinally along the bottom wall of the camera housing. The bottom wall has a pair of elongated wall portions 3 and 4 which are mutually spaced and parallel to each other and which define between themselves the elongated groove 2. At their inner surfaces which are directed toward each other the elongated wall portions 3 and 4 are respectively formed with elongated parallel identical coextensive aligned grooves 5, and the groove 5 of the elongated wall portion 4 is visible in FIGS. 2 and 3. The elongated pistol-grip type of handle 7 is always located at least in part within the space 2, and at one end portion the handle 7 carries a cross pin 6 having free end portions projecting beyond the handle 7 and forming a pair of projections thereof, these projections being respectively located within the grooves 5. The wall portions 3 and 4 are each formed with a pair of cutouts 8 passing therethrough, the cutouts 8 of the wall portion 4 being visible in FIGS. 2 and 3, and the cutouts 8 of the wall portion 3 are identical with and respectively aligned with the cutouts 8 of the wall portion 4. A lock means 9 is provided for releasably locking the handle 7 both in its collapsed position shown in FIG. 4 and its operative position shown in FIGS. 1 and 2, and this lock means is in the form of an elongated slide member 9 which has a substantially U-shaped configuration and which has a pair of spaced parallel legs slidable through the aligned pairs of cutouts 8 of the walls 3 and 4. The lock means also includes a pair of notches 10 respectively formed in the front and rear surfaces of the handle 7, extending all the way across these surfaces (FIG. 2) and a substantially T-shaped slot 16 extending transversely across the rear face of the handle 7 as is apparent from FIG. 2. Thus, it will be noted that in the operative position of FIG. 2 the legs of the lock member 9 are located in the cutouts 8 as well as in the notches 10 for locking the handle 7 in the operative position illustrated in FIG. 2.

The handle 7 pivotally carries a manually operable bell crank lever 11 which at the free end of its arm 11a carries a projection 12 adapted to be engaged by the operator and projecting forwardly beyond the handle 7 as shown in FIG. 2. The shorter arm 11b of the lever 11 engages a movable member 13 of the camera which is moved in response to clockwise turning of the lever 11, as viewed in FIG. 2, for starting the operation of the camera. Of course, the locking structure can be reversed with the handle carrying projections corresponding to the lock member 9 and adapted to be introduced into cutouts of the walls 3 and 4, and in this case several sets of cutouts may be distributed along the walls 3 and 4 to enable the operator to locate the handle at a selected location which is most comfortable for the operator.

In order to move the handle to its collapsed position the lock member 9 is withdrawn sufficiently from the position of FIG. 2 to enable the operator to turn the handle in the direction of the arrow 14 of FIG. 2 until the handle reaches the position shown in FIG. 3 and then the handle can be shifted relative to the bottom wall portion of the camera further into the space or groove 2 in the direction of the arrow 15 of FIG. 3 until the handle reaches the position shown in FIG. 4, and in this position the ends of the T-slot 16 are aligned with the cutouts 8 so that the lock means 9 can be shifted back to the position passing through the wall portions 3 and 4 as well as through the slot 16 for locking the handle 7 in the position shown in FIG. 4. As is apparent particularly from FIG. 3 the handle is provided at a rear wall portion with a threaded bore 17 which is of course directed downwardly when the handle is in the collapsed position of FIG. 4, and thus, this threaded bore portion 17 provides a means for mounting the camera on a support such as a suitable tripod or the like when the handle is in its collapsed position. Thus, because the handle is fixed to the camera when the handle is collapsed it is possible to provide a suitable support for the camera on a tripod or the like. It will be noted that in the position of FIG. 4 the handle is located almost entirely within the space 2 and does not project to any appreciable extent from the camera housing so that the latter can be located in a small space or casing and can conveniently be carried about.

Of course, the handle 7 is shown in its operative position in FIGS. 1 and 2, although the lock slide 9 is shown partly withdrawn in the position of FIG. 1 so that the details thereof can be clearly illustrated. In order to return the handle to its operative position the operator need only withdraw the lock means 9 so that it moves beyond the handle, and then the handle can be pulled out to the position of FIG. 3 and turned down to the position of FIG. 2, the projecting portions of the handle formed by the ends of the cross pin 6 sliding along the grooves 5 until they reach the front ends thereof to determine the location of the handle beneath the center of gravity of the camera with the lever arm 11b aligned with the element 13. Thus, when the operator can pull the handle forward no further than to the extent shown in FIG. 3 the operator will turn the handle down to the position of FIG. 2 and will then push the lock member 9 back to its locking position extending through the notches 10 as well as all the cutouts 8, so that now the handle is releasably locked in the position of FIG. 2 and in order to support the camera the operator need only press the finger-piece 12 rearwardly with one finger.

Of course, the notches 10 need not be located in the position shown in FIG. 2 where the handle 7 extends straight down from the camera housing 1. It is possible to locate the notches 10 so that when the legs of the lock slide 9 pass therethrough the handle has a somewhat inclined position relative to the camera housing providing a more comfortable grip. In addition, it is possible to provide a plurality of pairs of notches 10 enabling the operator to select the inclination for the handle 7.

According to the embodiment shown in FIGS. 5–9 the bottom wall portion of the camera is also formed with the elongated space or groove 2′ limited by the elongated parallel bottom wall portions 3′ and 4′ formed at their inner surfaces with the identical coextensive aligned grooves 5′. As is shown in FIG. 6 each groove 5′ has at its upper and lower surfaces a pair of slightly inclined aligned surface portions 5′a for a purpose described below.

The bottom wall of the camera includes a wall portion or plate 18 which is fixed to the camera and forms a surface of the groove or space 2′ which extends between the wall portions 3′ and 4′, and this plate or wall portion 18 is formed with a longitudinal central slot 18a which communicates symmetrically with the interior of the space 2.

The pistol-grip type of handle 7′ of this embodiment is in the form of a cylindrical plastic body 19 having a pair of opposed projections 20 respectively located in the grooves 5′ for shifting movement therealong and for turning movement therein.

The end of the handle 7′ which is uppermost when the handle is in its operative position shown in FIGS. 5 and 6 is formed with a bore 21 which has an open top so it is directed toward the wall portion 18, and a clamping block 22 is axially movable in this bore 21 and has front and rear clamping edges 22a as indicated in FIG. 6. The clamping block is fixed with an elongated screw member 24 which extends downwardly through an axial bore 23 of the body 19, and the lower threaded portion 24a of the screw 24 is threaded into a metal nut 25 which has a fixed, press-fit in a turnable cylindrical member 26 which forms part of the handle 7′ and is located beneath the body 19, this turnable member 26 having a knurled exterior surface, as is apparent from FIG. 5.

The recess 21 and clamping block 22 are of a mating non-circular cross sectional configuration so that the block 22 cannot turn in the recess 21, and in fact the top end of the handle 7′ is also non-circular so that it cannot turn within the space 2′.

The bottom end of the nut 25 has a threaded bore portion 27 enabling the camera to be mounted on a supporting structure such as a tripod or the like with the handle in its extended, operative position shown in FIGS. 5 and 6.

The nut 25 is rigidly fixed with the body 19, and for this purpose the body 19 carries in a pair of opposed bores internally threaded sleeves 29 which are fixed to the body 19 in any suitable way and which threadedly carry the pair of screws 28 which are respectively provided at their inner ends with pins extending into an annular groove 25a extending all the way around the nut 25 at the exterior thereof. Since the sleeves 29 which carry the screws 28 are fixed to the body 19 the nut 25 cannot move axially relative to the body 19 and thus the turnable member 26 remains at the bottom end of the body 19 when the turnable member 26 is turned by the operator. However, when the operator turns the member 26 and thus the nut 25 the screw 24 and the clamping block 22 fixed thereto will necessarily shift axially, and it is possible to turn the member 26 to a position where the clamping block 22 presses against the wall portion 18 so as to press the pins 20 downwardly against the lower surfaces 5'b of the grooves 5', and thus, this structure forms a means for releasably locking the handle 7' at any selected location along the grooves 5' while the handle is in its operative position. To release the handle for movement to its collapsed position it is only necessary to turn the member 26 so as to withdraw the clamping block 22 into the recess 21. This releasable locking means provides an exceedingly rigid and stable connection of the handle to the camera.

The screw 24 itself is formed with an axial bore 24b which is open at its top end and which receives an elongated rod 30 which is slidable within the bore 24b, and this rod 30 carries a cross pin 31 extending through longitudinal slots 32 which pass through the wall of the screw 24, the ends of the cross pin 31 extending into a space of the body 19 which accommodates a turnable lever 34 which is formed, for example, with a pair of spaced parallel side walls between which the screw 24 is located and respectively formed with aligned arcuate slots 33 which receive the ends of the cross pin 31. A pivot pin 35 extends across the space of the body 19 which receives the lever 34 and supports the latter for turning movement, and it is apparent that when the operator turns the lever 34 in a clockwise direction, as viewed in FIG. 6, the slots 33 will cam the pin 31 upwardly along the slots 32 so that the rod 30 will be raised into and through the slot 18a of the wall portion 18, and because this slot 18a extends centrally along the space 2' substantially along the entire length thereof the rod 30 can be moved through the slot 18a irrespective of the selected location of the handle 7' along the grooves 5'.

The camera includes in its interior a structure for starting the operation of the camera, and this structure includes a plate 36 located closely adjacent to and over the plate 18 covering the slot 18a thereof. In the illustrated example (FIG. 7) the plate 36 is hingedly connected at 37 along a longitudinal edge of the plate 36 to the camera housing or to the upper face of the wall 18, so that irrespective of the selected location of the handle 7' the plate 36 will turn in a clockwise direction, as viewed in FIG. 7, when the rod 30 is moved upwardly through the slot 18a into engagement with the plate 36 when the operator turns the lever 34 of FIG. 6 in a clockwise direction, as viewed in FIG. 6. The structure for starting the operation of the camera includes a projection 38 fixed to the plate 36 and engaged by a pin 41 which is guided for vertical movement and which is pressed downwardly against the projection 38 by the spring 40, so that when the operator releases the lever 34 the member 41 will be returned to a position stopping the operation of the camera and the plate 36 will be turned down next to the plate 18 pushing the rod 30 downwardly and returning the lever 34 to the position shown in FIG. 6. The longitudinally movable rod 41 stops and starts the camera in a manner well known in the art.

Figure 9:
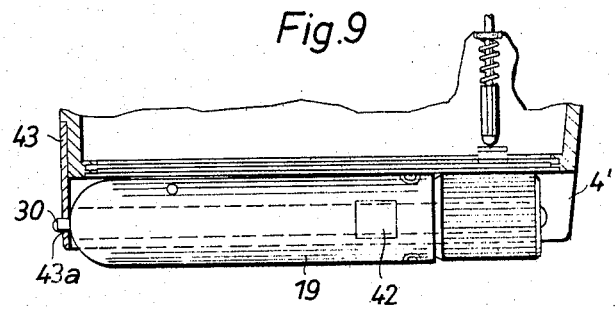
FIG. 9 shows the handle of FIGS. 5–8 in its final collapsed position.

In order to move the handle 7' from the operative position thereof illustrated in FIGS. 5 and 6 to the inoperative or collapsed position of FIG. 9 making the camera suitable for transportation, the turnable member 26 is first turned in order to withdraw the block 22 into the bore 21 and then the handle 7' can be turned from the position of FIG. 6 through 90 degrees to the position of FIG. 8 whereupon the handle is pushed to the left, as viewed in FIG. 8, until it reaches the position shown in FIG. 9. Opposed wall portions of the body 19 are formed with recesses in which a pair of curved leaf springs 42 are housed, and these leaf springs 42 form detents which snap into the space between the slightly inclined surface portions 5'a indicated in FIG. 6 and mentioned above, so that when the handle reaches the position of FIG. 9 the springy elements 42 will cooperate with the slightly inclined groove surfaces 5'a to releasably retain the handle in the position illustrated in FIG. 9, so that the handle can only be moved from the position of FIG. 9 by overcoming the force of the springs 42. In addition, when the handle is turned from the position of FIG. 6 to that of FIG. 7 the lever 34 engages the wall 18 to be turned into the recess of the body 19 which receives the lever 34, and this will again result in movement of the rod 30 outwardly beyond the free end of the handle 7'. The rear wall 43 of the camera housing is formed with an opening 43a which receives the projecting portion of the rod 30, as indicated in FIG. 9, when the handle has moved all the way into the space 2', so that in this way also the handle is prevented from being turned downwardly from the position of FIG. 9 and must first be moved forwardly in opposition to the springs 42.

It is also possible with the embodiment of FIG. 9 to provide between the axis of the handle 7' and the top face of the clamping block 22 an angle which will situate the handle at a position inclined somewhat differently from that shown in FIG. 6 to provide a more comfortable handle position for the operator. If desired, this inclination of the handle may be rendered adjustable simply by mounting the block 22 with more clearance in the recess 21 and connecting it pivotally to the top end of the screw 24 while providing on the handle a structure for tilting the block 22 relative to the screw 24 and maintaining it in a selected tilted position so that in this way a selected angular position of the handle can be achieved when the top face of the block 22 is pressed against the plate 18. For example, the projections 20 may form a pair of pins which extend through the wall of the body 19 and are fixed to the block 22 which in this case would be pivotally connected to the screw 24 and a suitable longitudinally shiftable rack located in a cutout of the body 19 can cooperate with a pinion fixed to one of these pins for turning the latter in response to shifting of the rack, the latter being moved by a suitable manually-engageable handle fixed to the rack and accessible at the exterior of the body 19 and capable of being fixed thereto in a selected position. Of course, in this case the opening of the block 22 which receives the top end of the screw 24 would be made large enough to provide the desired degree of tilting of the block 22 relative to the screw 24.

It is to be noted that a sleeve 44 is pressed into a recess at the rear portion of the body 19 and is formed with a threaded bore 44a so that when the body 19 is in the position of FIG. 9 this sleeve 44 forms a means for mounting the camera on a suitable structure such as a tripod or the like.

Moreover, instead of a cylindrical handle it is possible to provide a handle whose shape conforms to the palm of a hand which surrounds and grips the handle. Also, instead of a screw transmission for the means for releasably locking the handle at a selected location along the grooves 5' when the handle is in its operative position, it is possible to provide a spring-actuated locking arrangement.

Also, instead of locating the pins 20, which are fixed to the body 19, directly in the grooves 5', it is possible instead to locate a pair of slide-blocks in these grooves and respectively formed with openings which receive pins similar to but of a smaller diameter than the pins 20 so that in this way also the handle can be supported for shifting movement along the grooves 5'. Also, such slideblocks may be fixed directly to the handle and located in the grooves 5', and with such a construction the grooves 5' may be formed at at least one of their ends with enlarged portions in which these blocks can turn so that when such blocks are shifted to the rear ends of the grooves the entire handle can be turned through 90 degrees to its collapsed position, and of course with such a construction the handle would first have to be turned down away from the bottom wall before the blocks would be aligned with the grooves to be slidable therein.

Also, while the above-described construction is preferred since it permits the handle to be placed at an infinite number of positions along the grooves 5', it is possible to provide the upper end of the handle with a spring-pressed element capable of snapping into any one of a plurality of recesses carried by the bottom wall at any suitable part thereof including the portions 3' and 4', for example, so that with such a releasable detent structure it is also possible to selectively locate the handle at any one of a plurality of locations when the handle is in its operative position.

It is to be noted that where the camera has interchangeable objectives or where a flash assembly is adapted to be removably attached to the camera, the center of gravity of the camera is subject to change, and thus the possibility of selecting the particular location of the handle is of great value since the selected location can be adapted to the particular center of gravity determined not only by the permanent parts of the camera, but also by parts which are removably and interchangeably connected thereto.

As for the plate 36, while it has been described above as pivotally connected at 37 along a side edge to the camera so that it turns about an axis parallel to the groove 2', and while this structure is preferred because of its simplicity, nevertheless it is also possible to provide a plate 36 which forms part of a parallelogram linkage so that it is movable toward and away from the plate 18 while remaining parallel thereto.

It will be understood that each of the elements described above, or two or more together, may also find a useful application in other types of cameras differing from the types described above.

While the invention has been illustrated and described as embodied in cameras with handles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a camera housing having a bottom wall which includes a pair of elongated mutually spaced parallel wall portions which define between themselves an elongated space, said wall portions having inner surfaces directed toward each other and respectively formed with coextensive, aligned, elongated grooves; an elongated handle located at all times at least partly in said space and carrying at one end a pair of opposed projections which extend into and are slidable along said grooves so that said handle is turnable and shiftable relative to said bottom wall between a collapsed position in said space and an operative position projecting from said space, said camera in said operative position thereof being shiftable to any desired location along said grooves; and means carried by said handle and cooperating with said bottom wall for releasably fixing said handle in said operative position thereof at any desired location along said grooves.

2. In a camera as recited in claim 1, said means for releasably fixing said handle comprising an end face of said handle directed toward a surface of said bottom wall which extends between said side wall portions thereof and formed with a recess, a clamping block located in said recess, a manually turnable member forming part of said handle, and a transmission means operatively connected to said turnable member and said block for moving the latter to and from a position pressing against said surface of said bottom wall in response to turning of said turnable member for pressing said projections of said handle downwardly in said grooves to releasably fix said handle in said operative position thereof at any selected location along said grooves.

3. In a camera as recited in claim 2, said transmission means including an elongated screw member fixed to said block and extending along the interior of said handle and a nut fixed to said turnable member and threadedly receiving said screw member.

4. In a camera as recited in claim 3, said screw member itself being hollow and having an open end adjacent said surface of said bottom wall, said bottom wall being formed with an elongated slot passing therethrough at said surface thereof, an elongated motion transmitting rod slidable in said hollow screw member and having an end aligned with said slot, a manually turnable lever turnably carried by said handle, and means connecting said lever to said rod for shifting the latter upwardly into said slot upon turning of said lever when said handle is in said operative position thereof, said rod upon moving into said slot engaging and moving structure in the camera housing for starting the operation of the camera.

5. In a camera as recited in claim 4, said camera including an elongated plate carried by said bottom wall in said camera housing over and extending along said slot thereof and means connecting said plate to said bottom wall for turning movement relative thereto about an axis substantially parallel to said slot so that irrespective of the selected position of said handle in the operative position thereof actuation of said lever will move said rod into said slot to engage and turn said plate, said plate forming part of the structure for starting the camera upon turning of said plate in response to movement of said rod into said slot.

6. In a camera as recited in claim 4, a plate located in said camera housing directly over said slot of said bottom wall to be engaged by said rod upon movement thereof into said slot irrespective of the selected location of said handle when the latter is in its operative position, and means connecting said plate to said camera housing for movement relative thereto when engaged by said rod upon turning of said lever, said plate forming part of the structure for starting the operation of the camera when moved by said rod.

7. In a camera as recited in claim 6, spring means cooperating with said plate for urging the latter toward said slot.

8. In a camera, in combination, a camera housing having a bottom wall formed with an elongated exterior groove, said bottom wall having a pair of elongated wall portions which form the lateral limits of said groove and said wall portions respectively having inner surfaces directed toward each other and formed themselves with coextensive aligned grooves; a handle located at all times at least partly in said first mentioned groove; and means connecting an end portion of said handle to said bottom wall for shifting movement along and turning movement with respect to said groove, said means including projections formed on said handle and respectively located in said aligned grooves of said elongated wall portions, said handle being turnable and shiftable relative to said bottom wall between a collapsed position where substantially the entire handle is located in said groove and an operative position where only said end portion is in said groove and said handle projects from said bottom wall.

References Cited by the Examiner

UNITED STATES PATENTS

| 686,280 | 11/1901 | Gaudin | 16—115 |
| 2,173,437 | 9/1939 | Kataja | 16—115 X |
| 3,043,205 | 7/1962 | Kaminski | 95—86 |

FOREIGN PATENTS

| 1,039,258 | 5/1953 | France. |
| 343,226 | 1/1960 | Switzerland. |

JOHN M. HORAN, *Primary Examiner.*